US011001028B2

(12) United States Patent
Mark et al.

(10) Patent No.: US 11,001,028 B2
(45) Date of Patent: May 11, 2021

(54) CORRUGATOR MACHINE

(71) Applicant: BHS Corrugated Maschinen-und Anlagenbau GmbH, Weiherhammer (DE)

(72) Inventors: Maximilian Mark, Tirschenreuth (DE); Sebastian Zaruba, Weiherhammer (DE); Norbert Städele, Parkstein (DE)

(73) Assignee: BHS Corrugated Maschinen- und Anlagenbau GmbH, Weiherhammer (DE)

( * ) Notice: Subject to any disclaimer, the term of this patent is extended or adjusted under 35 U.S.C. 154(b) by 683 days.

(21) Appl. No.: 15/272,900

(22) Filed: Sep. 22, 2016

(65) Prior Publication Data
US 2017/0087793 A1    Mar. 30, 2017

(30) Foreign Application Priority Data
Sep. 24, 2015    (DE) ...................... 10 2015 218 338.6

(51) Int. Cl.
| | |
|---|---|
| *B31F 1/28* | (2006.01) |
| *B32B 29/08* | (2006.01) |
| *B32B 37/14* | (2006.01) |
| *B32B 38/00* | (2006.01) |
| *B41J 15/16* | (2006.01) |
| *B41J 15/04* | (2006.01) |

(Continued)

(52) U.S. Cl.
CPC ............ *B31F 1/2822* (2013.01); *B31F 1/285* (2013.01); *B32B 29/08* (2013.01); *B32B 37/14* (2013.01); *B32B 38/145* (2013.01); *B41J 3/00* (2013.01); *B41J 11/002* (2013.01); *B41J 15/04* (2013.01); *B41J 15/16* (2013.01)

(58) Field of Classification Search
CPC . B31F 1/2822; B31F 1/285; B31F 1/28; B41J 3/543; B41J 11/0015
See application file for complete search history.

(56) References Cited

U.S. PATENT DOCUMENTS 4,086,120 A * 4/1978 Cosby ....................... B31F 1/28
                                                          156/473
4,587,898 A    5/1986 Welschlau
(Continued)

FOREIGN PATENT DOCUMENTS

| | | |
|---|---|---|
| CN | 1 586 882 A | 3/2005 |
| DE | 27 45 854 A1 | 4/1979 |

(Continued)

*Primary Examiner* — John Zimmermann
(74) *Attorney, Agent, or Firm* — McGlew and Tuttle, P.C.

(57) ABSTRACT

The invention concerns a corrugator machine with an intermediate web dispensing device for dispensing an intermediate web, a top layer dispensing device for dispensing a top layer, a printing arrangement located downstream of the top layer dispensing device for printing the top layer, a device located downstream of the intermediate web dispensing device and the printing arrangement for producing a corrugated board web laminated on one side from the intermediate web and the top layer, a lamination web dispensing device for dispensing a lamination web, and a connection device for connecting the corrugated board web laminated on one side and the lamination web with each other whilst forming an at least three-layered corrugated board web.

20 Claims, 2 Drawing Sheets

(51) Int. Cl.
  *B41J 11/00*  (2006.01)
  *B41J 3/00*  (2006.01)

(56) References Cited

U.S. PATENT DOCUMENTS

| | | | |
|---|---|---|---|
| 5,117,610 A * | 6/1992 | Hartman | B41F 17/02 |
| | | | 101/490 |
| 5,772,819 A * | 6/1998 | Olvey | B29D 24/005 |
| | | | 156/82 |
| 6,170,881 B1 * | 1/2001 | Salmon | B41M 3/06 |
| | | | 283/91 |
| 6,207,242 B1 * | 3/2001 | Hoffman | B32B 29/00 |
| | | | 428/34.2 |
| 9,365,382 B2 | 6/2016 | Mark et al. | |
| 2004/0182503 A1 | 9/2004 | Stadele | |
| 2004/0182504 A1 | 9/2004 | Stadele et al. | |
| 2006/0148631 A1 * | 7/2006 | Protocsnak | B31F 1/2822 |
| | | | 493/463 |
| 2009/0262159 A1 * | 10/2009 | Lang | B41J 2/0057 |
| | | | 347/15 |
| 2012/0139984 A1 | 6/2012 | Lang | |
| 2013/0029825 A1 * | 1/2013 | Rich | B41J 3/543 |
| | | | 493/324 |
| 2014/0345804 A1 | 11/2014 | Fischer et al. | |
| 2015/0101740 A1 | 4/2015 | Morales et al. | |
| 2015/0151505 A1 | 6/2015 | Van Berlo et al. | |
| 2016/0303879 A1 | 10/2016 | Yamada et al. | |

FOREIGN PATENT DOCUMENTS

| | | |
|---|---|---|
| DE | 103 12 601 A1 | 9/2004 |
| DE | 103 12 600 A1 | 10/2004 |
| DE | 10 2011 087685 A1 | 6/2012 |
| DE | 10 2013 202 871 A1 | 9/2014 |
| DE | 10 2014 208 574 A1 | 11/2014 |
| FR | 1 044 793 A | 11/1953 |
| JP | 50-003042 B | 1/1975 |
| JP | S52-084083 A | 7/1977 |
| JP | S54-098811 A | 8/1979 |
| JP | H01-161026 U | 11/1989 |
| JP | H06-155066 A | 4/1994 |
| JP | 07-088083 B2 | 9/1995 |
| JP | H10-44269 A | 2/1998 |
| JP | H11-105241 | 4/1999 |
| JP | 2008-12842 A | 1/2008 |
| JP | 2010-017885 A | 1/2010 |
| JP | 2015-117030 A | 6/2015 |
| JP | 2017-61147 A | 3/2017 |
| WO | 2013/187775 A1 | 12/2013 |
| WO | 2014/128115 A1 | 8/2014 |

* cited by examiner

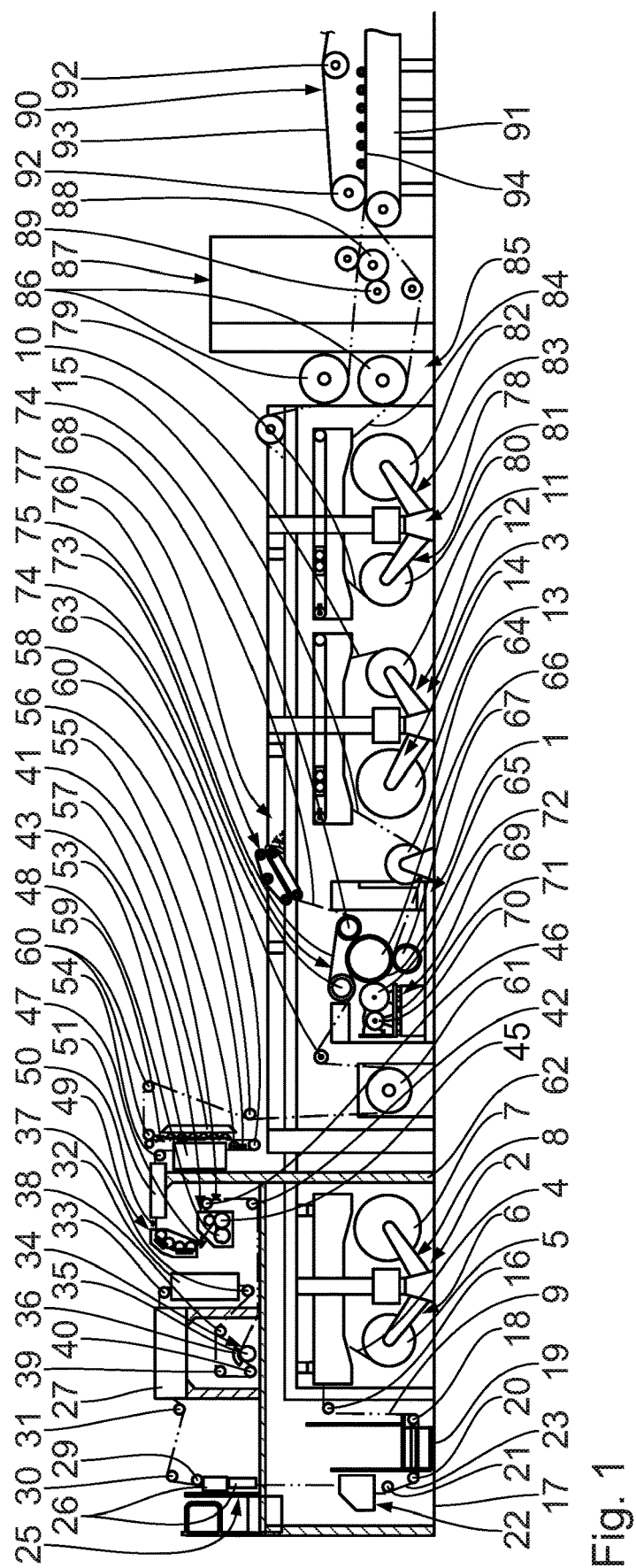
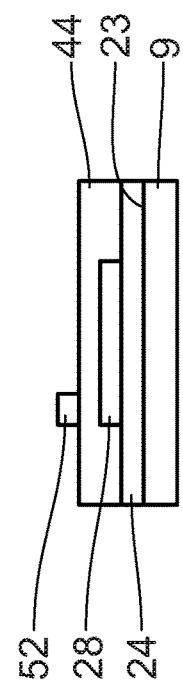
Fig. 1
Fig. 2

CORRUGATOR MACHINE

CROSS-REFERENCE TO RELATED APPLICATIONS

This application claims the priority of German Patent Application Serial No. DE 10 2015 218 338.6, filed on Sep. 24, 2015, pursuant to 35 U.S.C 119(a)-(d), the content of which is incorporated by reference in its entirety as if fully set forth herein.

FIELD OF THE INVENTION

The invention concerns a corrugator machine for producing corrugated board.

BACKGROUND OF THE INVENTION

Corrugator machines are generally known from prior art through obvious prior use. Prior art also discloses corrugator machines with integrated printing devices. It is often a disadvantage with these known corrugator machines that they have an enormous overall length in machine direction. The print quality of such corrugator machines is also often unsatisfactory.

SUMMARY OF THE INVENTION

It is therefore the task of the invention to overcome the disadvantages of prior art. In particular it shall provide a corrugator machine that comprises a comparatively short length in machine direction. The print quality of the corrugator machine shall also be particularly high.

This task is solved according to the invention by a corrugator machine for producing corrugated board, with an intermediate web dispensing device for dispensing an intermediate web, a top layer dispensing device for dispensing a top layer, a printing arrangement located downstream of the top layer dispensing device for printing the top layer, a device located downstream of the intermediate web dispensing device and the printing arrangement for producing a corrugated board web laminated on one side from the intermediate web and the top layer, a lamination web dispensing device for dispensing a lamination web, and a connection device for connecting the corrugated board web laminated on one side and the lamination web with each other whilst forming an at least three-layered corrugated board web. The core of the invention lies in that the top layer of the corrugated board web can be printed by means of a printing arrangement and is connected, in particular glue-laminated, with a corrugated web in a device for producing a corrugated board web that is laminated on one side. The top layer is favourably an outer web of the finished corrugated board (web) and visible on the same from the outside.

It is of advantage if the top layer is printed whilst being conveyed.

It is of advantage if the printing arrangement comprises a coating module for, in particular, the dosed or all-over application of at least one protective varnish coat layer to the printed top layer. The at least one protective varnish coat layer has an extremely high adherence to guarantee adhesion to components of corrugated board sheets. It is preferably formed from matt varnish.

It is convenient if the top layer dispensing device is designed as a top layer roll-out device for rolling out a top layer.

The intermediate web dispensing device is favourably designed as a splice device for dispensing an endless intermediate web.

It is of advantage if the laminated web dispensing device is designed as a laminated web splice device for dispensing an endless laminated web.

The finished corrugated board web is favourably a three-layer corrugated board web. Alternatively the same comprises more than three, such as five or seven, layers or webs. The corrugator machine then favourably comprises several devices for producing corrugated board webs laminated on one side.

The connection device is preferably designed as a heating or traction section or a heat-pressing device.

The terms "before", "after", "upstream", "downstream" or suchlike herein refer in particular to the conveying direction of the relevant web conveyed.

The designs in which the top layer dispensing device is designed as a splice device for dispensing an endless top layer allow an extremely economical and simple production of corrugated board. The top layer dispensing device preferably comprises two top layer roll-out units.

It is of advantage if the device for producing a corrugated board web laminated on one side comprises a riffling means for riffling the intermediate web whilst forming a corrugated web. The riffling means favourably comprises two rotatably mounted riffling cylinders that form a riffling gap for passing through the intermediate web to be riffled.

The device for producing a corrugated board web laminated on one side favourably comprises an adhesive application means for applying adhesive to the corrugated web. The adhesive application means preferably comprises a rotatably mounted adhesive application cylinder for transferring adhesive from an adhesive container to a corrugation of the corrugated web. It is of advantage if the adhesive application means also comprises an adhesive dosing cylinder lying against the adhesive application cylinder, for forming an even adhesive layer on the adhesive application cylinder.

It is convenient if the device for producing a corrugated board web laminated on one side comprises a contact means for pressing the adhesive-covered corrugated web and the top layer against each other. This design ensures a safe connection between the corrugated web and top layer.

It is of advantage if the contact means comprises a revolving smooth contact band for pressing the adhesive-covered corrugated web and top layer against each other, wherein the contact band is favourably made from a metal material. The contact band is favourably routed around at least two deflection rollers.

The design in which the printing arrangement is arranged at least in part, preferably at least mostly above the top layer dispensing device leads to an extremely space-saving arrangement of the printing arrangement. In general sufficient room for the printing arrangement remains above the top layer dispensing device in conventional production halls. In most cases production halls delimit the length of the corrugator machine.

The explanations of the embodiment in which the printing arrangement is arranged at least in part, preferably at least mostly above the top layer dispensing device substantially also apply to the embodiment in which the printing arrangement extends at least in some areas above the top layer dispensing device.

The printing device for printing the top layer is in particular capable of printing at least one imprint onto the top layer. The at least one imprint for example comprises at least one letter, a number, another symbol, a graphic and/or a photo. The at least one imprint favourably covers at least an area of one side of the top layer that is visible from the outside on the finished corrugated board web.

According to one embodiment the printing device is designed as an inkjet printing device. The inkjet printing device is in particular capable of ejecting water-based paint or ink for printing the top layer. It is of advantage if the inkjet printing device is designed to produce at least one water-based colour imprint on the top layer.

The design in which the printing arrangement comprises a print drying device for drying the top layer, located downstream of the printing device, allows a particularly good and fast further processing of the printed top layer.

The design in which a heating device for pre-heating the top layer is arranged between the printing arrangement and the device for producing a corrugated board web laminated on one side results in an extremely durable connection between the top layer and the intermediate web.

The top layer rewinding means for rewinding the top layer, said top layer rewinding means being arranged between the printing arrangement and the device for producing a corrugated board web laminated on one side, enables a rewinding of the, in particular printed, top layer. The in particular printed top layer can be stored on the top layer rewinding means in this way.

The design in which at least one support frame is provided for supporting at least a part of the printing arrangement and the design in which the at least one support frame is designed separately from a corrugator machine bridge that supports a storage device for storing the corrugated board web laminated on one side lead to an extremely high print quality, as vibration from the top layer dispensing device is not directly transferred to the printing arrangement or to the top layer conveyed through the printing arrangement. The at least one support frame enables a vibration decoupling between the top layer dispensing device and the printing arrangement in this way.

The design in which at least one vibration decoupling element for at least partially, in particular completely, vibration decoupling the at least one support frame from the corrugator machine bridge is arranged between the at least one support frame and the corrugator machine bridge in particular effects a vibration decoupling between the top layer dispensing device or the corrugator machine bridge and the printing arrangement or the at least one support frame bearing the printing arrangement at least in part. This in turn leads to an extremely high print quality. The at least one vibration decoupling element is preferably flexible. It is for example made from a flexible material and/or formed as at least one bellows.

According to one embodiment, the printing device applies water-based inkjet ink to the top layer and is then equipped with a water-based varnish, wherein the varnish is applied to the top layer with a conventional coating module and/or an inkjet printing device. Said varnish layer favourably enables damage-free progress of the corrugated board web through the corrugator machine according to the invention and protects the printed image against heat influence and pressure loads during the adhesion process with the corrugated board web.

Preferred embodiments of the invention are described hereafter by way of examples with reference to the enclosed drawing.

BRIEF DESCRIPTION OF THE DRAWING

FIG. 1 shows a schematic side view of a corrugator machine according to the invention, FIG. 2 shows a simplified section through a corrugated board web produced with the corrugator machine illustrated in FIG. 1 that is not to scale.

DESCRIPTION OF THE PREFERRED EMBODIMENTS

Figure 3:
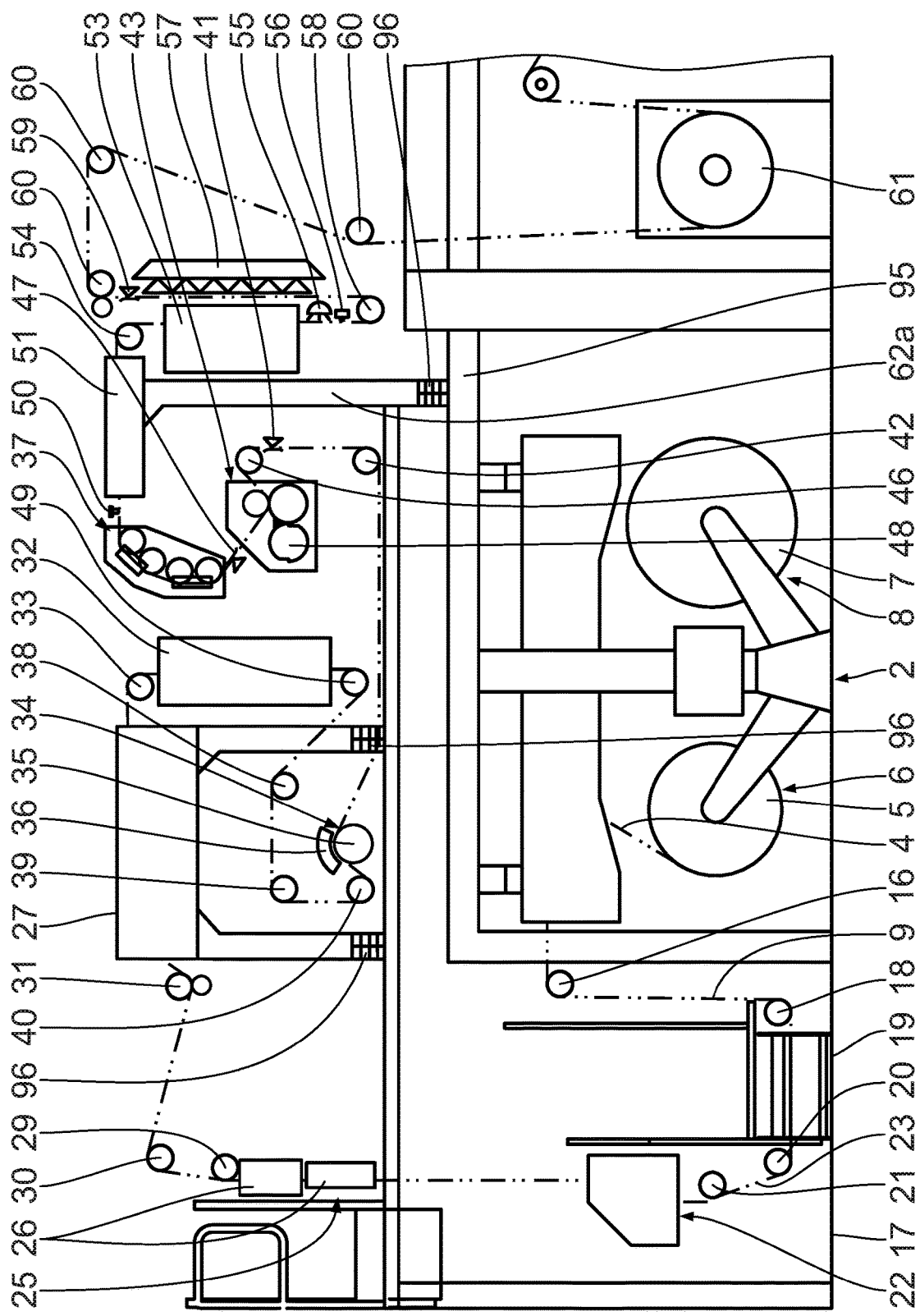
FIG. 3 shows a section of a corrugator machine according to the invention according to FIG. 1, wherein the support frame is here vibration decoupled from the corrugator machine bridge.

A corrugator machine comprises a device 1 for producing a corrugated board web laminated on one side.

A top layer splice device 2 and an interim splice device 3 are positioned before the device 1 for producing a corrugated board web laminated on one side.

The top layer splice device 2 comprises a first roll-out unit 6 for rolling out a finite first top layer 4 from a first top layer roll 5, and a second roll-out unit 8 for rolling out a finite second top layer from a second top layer roll 7. The finite first top layer 4 and the finite second top layer are connected with each other for providing an endless top layer 9 by means of a connection and cutting unit, not shown, of the top layer splice device 2.

The intermediate web splice device 3 is designed like the top layer splice device 2. This comprises a third roll-out unit 12 for rolling out a finite first intermediate web 10 from a first intermediate web roll 11, and a fourth roll-out unit 14 for rolling out a finite second intermediate web from a second intermediate web roll 13. The finite first intermediate web 10 and the finite second intermediate web are connected with each other for providing an endless intermediate web 15 by means of a connection and cutting unit, not shown, of the intermediate web splice device 3.

The endless top layer 9 is conveyed over a first deflection roller 16 arranged downstream from the top layer splice device 2 in relation to conveying the endless top layer 9 and adjacent to the same, downwards in the direction of a ground or floor 17, on which the corrugator machine stands.

The endless top layer 9 is then conveyed around a second deflection roller 18 and runs substantially parallel under an access pedestal 19 downstream of the same. It runs substantially adjacent to the ground 17 there.

Downstream from the access pedestal 19 standing on the floor the endless top layer 9 is conveyed over a third and fourth deflection roller 20 or 21 into a pre-coating application device 22 allocated to the endless top layer 9, which applies an areal pre-coating 24 to the outside 23 of the endless top layer 9. The pre-coat application device 22 is arranged at the side of the top layer splice device 2. The endless top layer 9 runs upwards downstream from the third deflection roller 20.

Downstream from the pre-coat application device 22 the endless top layer 9 is allocated to a pre-coating drying device 25, which dries the endless top layer equipped with pre-coating 24 on the outside or the pre-coating 24. The pre-coating drying device 25 has two pre-coating drying means 26 arranged one after the other or in a row. The pre-coating drying device 25 is arranged at the side above the top layer splice device 2.

Downstream from the pre-coating drying device 25 the endless top layer 9 is allocated to an inkjet printing device 27 that prints at least one imprint 28 onto the outside of the endless top layer 9 or onto the dried pre-coating 24. The pre-coating 24 is therefore located between the at least one imprint 28 and the endless top layer 9. The at least one imprint 28 is favourably a water-based colour imprint. The endless top layer 9 is conveyed from the pre-coating drying device 25 to the inkjet printing device 27 via fifth, sixth and seventh deflection roller 29, 30 or 31. The inkjet printing device 27 is arranged above the top layer splice device 2 and covers the same in some areas.

Downstream from the inkjet printing device 27 an inkjet print drying device 32 is allocated to the endless top layer 9, which dries the printed endless top layer 9 or the at least one imprint 28. An eighth deflection roller 33 that deflects the endless top layer 9 downwards by about 90° is located between the inkjet printing device 27 and the inkjet print drying device 32. The inkjet print drying device 32 extends substantially vertical to the inkjet printing device 27. It is arranges above the top layer splice device 2.

Downstream from the inkjet print drying device 32 a corona pre-treatment device 34 is allocated to the endless top layer 9, which comprises a corona support cylinder 35 and at least one electrode 36 arranged adjacent to the same. The endless top cover 9 is routed around the corona support cylinder 35. The endless top layer 9 runs through a gap formed by the corona support cylinder 35 and the at least one electrode 36 for this. The corona pre-treatment device 34 exposes the endless top layer 9 to an electric corona discharge, which leads to an oxidation of its surface. This results in higher point increases during ink application or during printing. The adhesion of a printing ink to the endless top layer 9 is improved as follows:

The endless top layer 9 is conveyed from the inkjet print drying device 32 via a ninth, tenth, eleventh and twelfth deflection roller 37, 38, 39 or 40, so that the corona pre-treatment device 34 is arranged below the inkjet printing device 27. The corona pre-treatment device 34 is arranged between the inkjet printing device 27 and the top layer splice device 2.

Downstream from the corona pre-treatment device 34 a first humidity measuring unit 41 is allocated to the endless top layer 9, which measures the moisture or humidity of the endless printed and dried top layer 9. The measurement is favourably carried out capacitively in a high frequency scatter field.

A thirteenth deflection roller 42 is located between the corona pre-treatment device 34 and the first humidity measuring unit 41, which deflects the endless top layer 9 upwards by about 90°.

Downstream from the first humidity measuring unit 41 a coating module 43 is allocated to the endless top layer 9 for an all-over application of at least one transparent top varnish coat layer 44 to the outside of the top layer 9. The at least one imprint 28 is thus located between the at least one varnish coat layer 44 and the pre-coating 24. The at least one varnish coat layer 44 covers the at least one imprint 28 completely and lies directly on the same. The at least one varnish coat layer 44 is favourably formed by matt varnish based on water and also known as water varnish or dispersion varnish. The coating module 43 has at least one varnish coat application cylinder 45 that applies varnish from a varnish container onto the endless top layer 9 for this. The coating module 43 also comprises a stationary varnish dosing cylinder 48 adjusted at a precise angle to the varnish application cylinder 45 to ensure an even varnish film on the same. Other coating modules can alternatively be used.

A thirteenth deflection roller 46 is located between the first humidity measuring unit 41 and the coating module 43, which deflects the endless top layer 9 in the direction of the inkjet print drying device 32. The coating module 43 is arranged above the top layer splice device 2.

Downstream from the coating module 43 a second humidity measuring unit 47 is allocated to the endless top layer 9, which is designed like the first humidity measuring unit 41 and measures the moisture or humidity of the varnished endless top layer 9 or the varnish layer thickness.

We refer to DE 10 2015 218 325.4 for the detailed construction and precise function of the coating device.

Downstream from the coating module 43 a top layer inspection device 49 is allocated to the endless top layer 9, which inspects the endless top layer 9 for faults, in particular on its outside 23. A sensor inspection of the varnished endless top layer 9 with regard to flatness or evenness in particular is carried out. The top layer inspection device 49 is arranged above the top layer splice device 2. We refer for example to WO 2014/128115 A1 for details and the function of the top layer inspection device 49.

Downstream from the top layer inspection device 49 a contrast sensor 50 is allocated to the endless top layer 9, which senses the contrast of the printed and varnished endless top layer 9.

Downstream from the contrast sensor 50 an inkjet coating device 51 is allocated to the endless top layer 9, which applies at least one spatially delimited inkjet varnish area 52, in particular of transparent glossy ink, to the outside of the endless top layer 9. The at least one varnish coat layer 44 is located between the at least one inkjet varnish area 52 and the pre-coating 24.

The at least one inkjet varnish area 52 favourably covers the at least one imprint 28 at least in some areas, such as for example along its contours or all over. The inkjet coating device 51 is arranged above the top layer splice device 2.

Alternatively or additionally a mark reading device is allocated to the endless top layer 9, which is in particular capable of reading or recording external marks on the endless top layer 9. Controlling the position of the at least one inkjet varnish area 52 is possible with applied marks.

Downstream from the inkjet coating device 51 an inkjet coat drying device 53 for drying the endless top layer 9 or the at least one inkjet varnish area 52 is allocated to the endless top layer 9. The inkjet coat drying device 53 is arranged at the side above the top layer splice device 2. Drying is preferably carried out by means of infrared radiation and/or hot air.

A fourteenth deflection roller 54 is located between the inkjet coat drying device 53 and the inkjet coating device 51, which deflects the endless top layer 9 by about 90° and guides the same downwards to the inkjet coat drying device 53.

Downstream from the inkjet coat drying device 53 a flash unit 55 is allocated to the endless top layer 9, which checks the precise fit of the inkjet varnish areas 52. An overprint accuracy of the at least one inkjet varnish area with regard to the at least one imprint 28 can be detected or adjusted in this way.

Downstream from the flash unit 55 a gloss measuring unit 56 is allocated to the endless top layer 9, which measures the gloss of outside of the endless top layer 9 or the at least one inkjet varnish area 52.

Downstream from the gloss measuring unit 56 a moistening device 57 is allocated to the endless top layer 9, which supplies water, in particular in the form of a vapour spray, onto the endless top layer 9 opposite the outside 23 of the endless top layer 9. In this way the flatness and a homogeneous humidity profile of the endless top layer 9 can be guaranteed. The moistening device 57 is arranged at the side above the top layer splice device 2.

A fifteenth deflection roller 58 is arranged between the gloss measuring unit 56 and the moistening device 57, which deflects the endless top layer 9 by about 180° and guides it upwards to the remoistening device 57.

Downstream from the remoistening device 57 a third humidity measuring unit 59 is allocated to the endless top layer 9, which measures the humidity of the endless top layer 9 and is formed like the first or second humidity measuring unit 41, 47.

The pre-coat application device 22, the pre-coat drying device 25, the inkjet printing device 27, the inkjet print drying device 32, the corona pre-treatment device 34, the inkjet coating device 51, the top layer inspection device 49, the moistening device 57 and the humidity measuring unit 41, 47, 59 and the contrast sensor 50, the flash unit 55, the gloss measuring unit 56 together form a printing arrangement. The printing arrangement is easily accessible via the access pedestal 19.

The printing arrangement is at least mostly arranged on a support frame 62 above the top layer splice device 2, which is supported on the ground 17. The support frame 62 favourably has its own foundation.

With the exception of the pre-coat application device 22 all components of the printing arrangement are supported by the support frame 62 above the top layer splice device 2.

The endless top layer 9 is guided out of the printing arrangement via the further deflection rollers 60. The endless top layer is guided downwards in the direction of the ground 17 via the further deflection rollers 60.

The endless top layer 9 is then guided into the device 1 for producing a corrugated board web laminated on one side via a heated cylinder 61 and via a further deflection roller 63. The heated cylinder 61 here effects a smoothing of the endless top layer 9 in addition to heating and dehumidifying the paper. The endless intermediate web 15 is also guided to the device 1 for producing a corrugated board web laminated on one side via a further deflection roller 64.

The device 1 for producing a corrugated board web laminated on one side comprises a rotatably mounted first riffling cylinder 66 and a rotatably mounted second riffling cylinder 67 for producing an endless corrugated web 65 with a corrugation from the endless intermediate web 15. The riffling cylinders 66, 67 form a cylinder gap conveying and riffling the endless intermediate web 15. The axes of rotation of the two riffling cylinders 66, 67 extend parallel to each other. The riffling cylinders 66, 67 together form a riffling means.

The device 1 for producing a corrugated board web laminated on one side comprises an adhesive application means 69 for connecting the endless corrugated web 65 with the endless top layer 9 to an endless corrugated board web 68 laminated on one side, which in turn comprises an adhesive dosing cylinder 70, an adhesive container 71 and an adhesive application cylinder 72. The adhesive application cylinder 72 forms an adhesive application gap with the first riffling cylinder 66 for guiding and applying adhesive to the endless corrugated web 65. The adhesive inside the adhesive container 71 is applied to tips of the corrugation of the endless corrugated web 65 via the adhesive application cylinder 72. The adhesive dosing cylinder 70 lies against the adhesive application cylinder 72 and serves for forming an even adhesive layer on the adhesive application cylinder 72.

The endless top layer 9 is then joined together with the endless corrugated web 65 equipped with adhesive from the adhesive container 71 in the device 1 for producing a corrugated board web laminated on one side whilst forming the corrugated board web 68 laminated on one side.

The device 1 for producing a corrugated board web laminated on one side has a contact means 73 for pressing the endless top layer 9 against the endless corrugated web 65 equipped with adhesive, which in turn lies against the first riffling cylinder 66 in some areas. The contact means 73 is designed as a contact band module and is arranged above the first riffling cylinder 66. The contact band module 73 has two deflection cylinders 74 as well as an endless smooth contact band 75, guided around the two deflection cylinders 74 and consisting of a metal material. The first riffling cylinder 66 engages areas of a space between the deflection cylinders 74 from below, so that the first riffling cylinder 66 deflects the contact band 75. The contact band 75 presses against the endless top layer 9, which is in turn pressed against endless corrugated web 65 equipped with adhesive and lying against the first riffling cylinder 66.

The endless corrugated board web 68 laminated on one side is supplied to a storage means 77 via a high-level transport means 76, where the same forms loops or tabs, for temporarily storing and buffering the same.

The corrugator machine also has a lamination web splice device 78, which is designed like the top layer splice device 2 or the intermediate web splice device 3. The lamination web splice device 78 comprises a fifth roll-out unit 81 for rolling out a finite first lamination web 79 from the first lamination web roll 80 and a sixth roll-out unit 83 for rolling out a finite second lamination roll from a second lamination web roll 82. The finite first lamination web 79 and the second lamination web are connected with each other for providing an endless lamination web 84 by means of a connection and cutting unit, not shown, of the lamination web splice device 78.

A pre-heating device 85 comprising two pre-heating cylinders 86 arranged above each other is arranged downstream from the storage means 77 and the lamination web splice device 78. The pre-heating device 85 is supplied with the corrugated board web 68 laminated on one side and the endless lamination web 84, which both partially enclose the relevant pre-heating cylinder 86. The endless lamination web 84 runs below the corrugated board web 68 laminated on one side in the pre-heating device 85, wherein the outside 23 of the endless top layer 9 is directed upwards or outwards.

An adhesive module 87 with an adhesive application cylinder 88 is arranged downstream from the pre-heating device 85, which is partially submersed in an adhesive bath. The corrugated board web 68 laminated on one side is in contact with the adhesive application cylinder 88 with its corrugated web 65 and is equipped with adhesive from the adhesive bath in this way. A dosing cylinder 89 lies against the circumference of the adhesive application cylinder 88 for forming an even adhesive film on the adhesive application cylinder 88. The endless lamination web 84 runs below the corrugated board web 68 laminated on one side in the adhesive module 87.

A heat-pressing device 90 comprising a horizontally extending heated table 91 with heating elements is arranged downstream from the adhesive module 87. A contact belt 93 conveyed across guide cylinders 92 is arranged adjacent to the heated table 91. A contact gap is formed between the contact belt 93 and the heated table 91, through which the corrugated board web 68 laminated on one side and the endless lamination web 84 are guided. An endless corrugated board web 94 laminated on two sides is formed in the heat-pressing device 90, which is printed and varnished on the outside.

Downstream from the heat-pressing device 90 a longitudinal cutting/grooving device (not shown) for longitudinally cutting and grooving the corrugated board web 94, a transverse cutting device for transversely cutting the corrugated board web 94, a switch (not shown) for dividing part corrugated board webs from the corrugated board web 94 into different levels, and transverse cutting devices (not shown) for transversely cutting the part corrugated board webs into corrugated board sheets as well as stapling devices (not shown) for stapling the corrugated board sheets are arranged.

A further embodiment will be described hereafter with reference to FIG. 3. Identical parts will be identified with the same reference numbers as those of the previous embodiment, to the description of which we herewith refer. Constructively different, but functionally identical parts will be identified with the same reference number with a subordinated "a".

Contrary to the previous embodiment the support frame 62*a* bearing the printing arrangement is vibration decoupled from a corrugator machine bridge 95. For this several vibration decoupling elements 96 are envisaged, which are arranged between the printing arrangement or the support frame 62*a* and the corrugator machine bridge 95. The support frame 62*a* if favourably supported on the vibration decoupling elements 96 opposite the corrugator machine bridge 95. Alternatively the vibration decoupling elements 96 are inserted into the support frame 62*a* and/or the corrugator machine bridge 95.

The corrugator machine bridge 95 extends above the top layer splice device 2. It extends between the printing arrangement and the top layer splice device 2. The corrugator machine bridge 95 is in turn supported on the ground.

What is claimed is:

1. A corrugator machine for producing corrugated board, the corrugator machine comprising:
   an intermediate web dispensing device for dispensing an intermediate web;
   a top layer dispensing device for dispensing a top layer;
   a printing arrangement located downstream of the top layer dispensing device for printing the top layer, the printing arrangement extending at least in part above the top layer dispensing device such that at least part of the printing arrangement covers at least a portion of the top layer dispensing device;
   a device located downstream of the intermediate web dispensing device and the printing arrangement for producing a corrugated board web laminated on one side from the intermediate web and the top layer;
   a lamination web dispensing device for dispensing a lamination web;
   at least one support frame for supporting at least a part of the printing arrangement; and
   a connection device for connecting the corrugated board web laminated on one side and the lamination web with each other whilst forming an at least three-layered corrugated board web.

2. A corrugator machine according to claim 1, wherein the top layer dispensing device is designed as a splice device for dispensing an endless top layer.

3. A corrugator machine according to claim 1, wherein the printing arrangement is arranged at least mostly above the top layer dispensing device.

4. A corrugator machine according to claim 1, further comprising:
   a corrugator machine bridge for supporting a storage device for storing the corrugated board web laminated on one side, wherein the at least one support frame is designed separately from the corrugator machine bridge, wherein the printing arrangement comprises a printing device for printing the top layer.

5. A corrugator machine according to claim 4, wherein the printing device comprises an inkjet printing device.

6. A corrugator machine according to claim 4, wherein the printing arrangement comprises a print drying device for drying the top layer, located downstream of the printing device.

7. A corrugator machine according to claim 1, wherein a heating device for pre-heating the top layer is arranged between the printing arrangement and the device for producing a corrugated board web laminated on one side.

8. A corrugator machine according to claim 1, wherein a top layer rewinding means for rewinding the top layer is arranged between the printing arrangement and the device for producing a corrugated board web laminated on one side.

9. A corrugator machine according to claim 1, wherein at least one vibration decoupling element for at least partially vibration decoupling the at least one support frame from the corrugator machine bridge is arranged between the at least one support frame and the corrugator machine bridge.

10. A corrugator machine according to claim 1, wherein at least one vibration decoupling element for completely vibration decoupling the at least one support frame from the corrugator machine bridge is arranged between the at least one support frame and the corrugator machine bridge.

11. A corrugator machine according to claim 1, wherein the printing device applies water-based inkjet ink to the top layer and is then equipped with a water-based varnish, wherein the varnish is applied to the top layer with at least one of a conventional coating module and an inkjet printing device.

12. A corrugator machine for producing corrugated board, the corrugator machine comprising:
    an intermediate web dispensing device for dispensing an intermediate web;
    a top layer dispensing device for dispensing a top layer;
    a support frame structure, at least a portion of the support frame structure extending above the top layer dispensing device;
    a printing arrangement located downstream of the top layer dispensing device for printing the top layer;
    a device located downstream of the intermediate web dispensing device and the printing arrangement for producing a corrugated board web laminated on one side from the intermediate web and the top layer;
    a lamination web dispensing device for dispensing a lamination web;
    a corrugator machine bridge for supporting a storage device for storing the corrugated board web laminated on one side, the corrugator machine bridge being a structure that is separate from the support frame structure; and
    a connection device for connecting the corrugated board web laminated on one side and the lamination web with each other to form an at least three-layered corrugated board web.

13. A corrugator machine in accordance with claim 12, wherein at least one vibration decoupling element for completely vibration decoupling the support frame structure from the corrugator machine bridge is arranged between the support frame structure and the corrugator machine bridge.

14. A corrugator machine in accordance with claim 13, wherein at least another vibration decoupling element is arranged between the support frame structure and the portion of the printing arrangement for completely vibration decoupling the support frame structure from the portion of the printing arrangement.

15. A corrugator machine in accordance with claim 14, wherein at least a portion of the corrugator machine bridge is arranged between the support frame structure and the top layer dispensing device.

16. A corrugator machine according to claim 12, wherein the printing arrangement comprises a printing device for printing the top layer.

17. A corrugator machine according to claim 16, wherein the printing device comprises an inkjet printing device.

18. A corrugator machine according to claim 16, wherein the printing arrangement comprises a print drying device for drying the top layer, located downstream of the printing device.

19. A corrugator machine for producing corrugated board, the corrugator machine comprising:
- an intermediate web dispensing device for dispensing an intermediate web;
- a top layer dispensing device for dispensing a top layer;
- a support frame structure;
- a printing arrangement located downstream of the top layer dispensing device for printing the top layer;
- a device located downstream of the intermediate web dispensing device and the printing arrangement for producing a corrugated board web laminated on one side from the intermediate web and the top layer;
- a lamination web dispensing device for dispensing a lamination web;
- a corrugator machine bridge for supporting a storage device for storing the corrugated board web laminated on one side, the corrugator machine bridge being a structure that is separate from the support frame structure; and
- a connection device for connecting the corrugated board web laminated on one side and the lamination web with each other to form an at least three-layered corrugated board web.

20. A corrugator machine in accordance with claim 12, wherein at least one vibration decoupling element for completely vibration decoupling the support frame structure from the corrugator machine bridge is arranged between the support frame structure and the corrugator machine bridge, wherein at least another vibration decoupling element is arranged between the support frame structure and at least the portion of the printing arrangement for completely vibration decoupling the support frame structure from the portion of the printing arrangement.

* * * * *